United States Patent [19]

Dageförde

[11] 3,903,354

[45] Sept. 2, 1975

[54] CABLE WITH HIGH TENSILE STRENGTH SHEATHING

[75] Inventor: Hans-Gerd Dageförde, Duisburg, Germany

[73] Assignee: AEG-Telefunken Kabelwerke Aktiengesellschaft, Rheydt, Rheydt, Germany

[22] Filed: Mar. 8, 1974

[21] Appl. No.: 449,547

[30] Foreign Application Priority Data

Mar. 8, 1973 Germany............................ 2311958

[52] U.S. Cl............................ 174/107; 174/122 G
[51] Int. Cl. ............................................ H01b 7/18
[58] Field of Search............ 174/107, 122 G, 124 G, 174/124 GC, 107, 102 R, 36

[56] References Cited
UNITED STATES PATENTS

| | | | |
|---|---|---|---|
| 2,204,288 | 6/1940 | Wilkoff | 174/124 G |
| 2,587,916 | 3/1952 | Squier | 174/124 G |
| 3,649,744 | 3/1972 | Coleman | 174/124 GC |
| 3,717,720 | 2/1973 | Snellman | 174/124 G |

FOREIGN PATENTS OR APPLICATIONS

| | | | |
|---|---|---|---|
| 1,178,952 | 5/1959 | France | 174/122 G |
| 465,321 | 5/1937 | United Kingdom | 174/124 G |
| 465,322 | 5/1937 | United Kingdom | 174/124 G |
| 520,246 | 4/1940 | United Kingdom | 174/124 G |
| 536,604 | 5/1941 | United Kingdom | 174/124 G |

OTHER PUBLICATIONS

Layton, P. L., *Fiberglas Yarns – Their Qualities and Applications*, Wire, August 1952, pp. 776–778.

*Primary Examiner*—Arthur T. Grimley
*Attorney, Agent, or Firm*—Spencer & Kaye

[57] ABSTRACT

A cable core is provided with a sheathing having high tensile strength, and which is impermeable to fluids and longitudinally conductive, in that the sheathing is composed of a band of parallel glass fibers extending along the length of the core, a metal foil, and a plastic sheath, with the band and foil being attached together and wrapped around the core so that their edges overlap to form a seam and the plastic sheath being bonded by adhesive to the band-foil assembly to hold their edges together.

10 Claims, 5 Drawing Figures

CABLE WITH HIGH TENSILE STRENGTH SHEATHING

BACKGROUND OF THE INVENTION

The present invention relates to a cable with a high tensile strength sheathing.

Cables with high tensile strength sheaths are used mainly in overhead, exposed installations.

Such cable sheathings are produced, for example, by placing a band of glass fibers around the cable core and bonding it in a subsequent extrusion process to cause it to be homogeneous with the resulting cable sheath.

Cables of this type have been found to have the drawback of insufficient gas or moisture tightness owing to the properties of the plastic. Moreover, it is often necessary for some element of the cable which does not participate in the transmission of power or information, to have a longitudinal conductivity which can be utilized for protective functions against extraneous influences, for example extraneous voltage surges produced by lightening.

SUMMARY OF THE INVENTION

It is an object of the present invention to provide an improved cable with a high tensile strength plastic sheath which is at the same time impermeable to liquids and gases and longitudinally conductive.

This is accomplished, according to the present invention, by attaching a band of parallel, longitudinally extending glass fibers to a metal foil, enclosing the cable core in an overlapping manner by the resulting sheet and bonding the sheet together with at least one plastic sheath.

In the arrangement according to the present invention, the cable is sealed off by the metal foil in a diffusion-tight, or impermeable, manner. Moisture and water vapor cannot penetrate to the cable core through this combined sheath.

Due to its conductivity, the metal foil forms a static shielding element against electrical fields and due to its longitudinal conductivity it forms a desirable element which can be connected to a ground potential in order to perform, for example, protective functions aginst extraneous influences or permit switching to ground.

DESCRIPTION OF THE PREFERRED EMBODIMENTS

Figure 1:
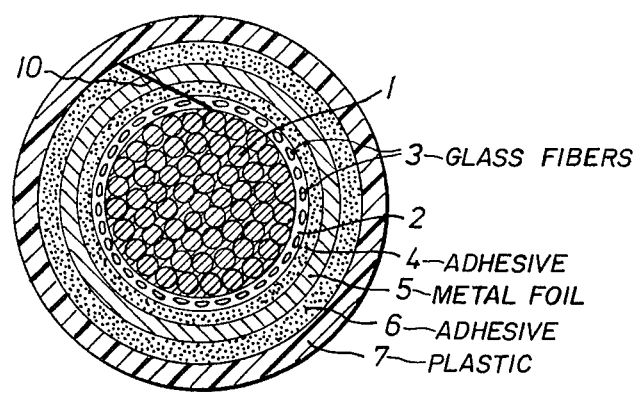
FIG. 1 is a cross-sectional view of a cable constructed according to the present invention.

FIG. 1 shows a cable having a core 1 containing current conductors. Around this cable core a band 2 is applied which consists of parallel, longitudinally extending glass fibers 3. This band is connected, via adhesive layer 4, with a surrounding metal foil 5 made, for example of copper or aluminum, and having a thickness of approximately 0.2 mm. A further adhesive layer 6 is applied to the metal foil 5, and layer 6 is enclosed by a core sheath 7 of a plastic material. Layer 6 may be, for example, a copolymer of the material of core sheath 7, and the material for the core sheath may be, for example, polyethylene. The adhesive layer 6 connects the metal foil 5 with the core sheath 7 in a force transmitting manner during the extrusion process. The longitudinal edges of band 2 and foil 5 are joined together along an obliquely extending longitudinal seam 10 so that the edges of each layer overlap.

FIG. 1 of course shows only one example of the configuration of the cable according to the present invention. Alternatively, the core sheath of polyethylene may also be applied between the cable core and the band of longitudinal glass fibers and an additional sheath of plastic may be attached around the outside of the assembly. It is also conceivable to apply the glass fiber band and the metal foil in the reverse order.

Preferably, the fiber band is attached to the metal foil so that each fiber strand is individually connected to the foil.

The band 2 of glass fibers may be constituted by a plurality of superimposed fiber layers. Furthermore, the band 2 can be constituted by two partial bands each attached to a respective side of the metal foil 5 by a respective adhesive layer. According to a further embodiment of the invention, the band 2 can be additionally provided with transversely, or circumferentially, extending fibers interwoven with the longitudinally extending fibers.

In further accordance with the invention band 2 is formed so that the seam 10 has as thin a layer of glass fibers as possible. The latter effect can be achieved by subjecting a glass fiber sheet to a high pressure rolling operation to compress the sheet into a flat layer so that in the region of the seam formed by wrapping the band around the core there is a glass fiber layer which is as thin as possible.

Figure 2:
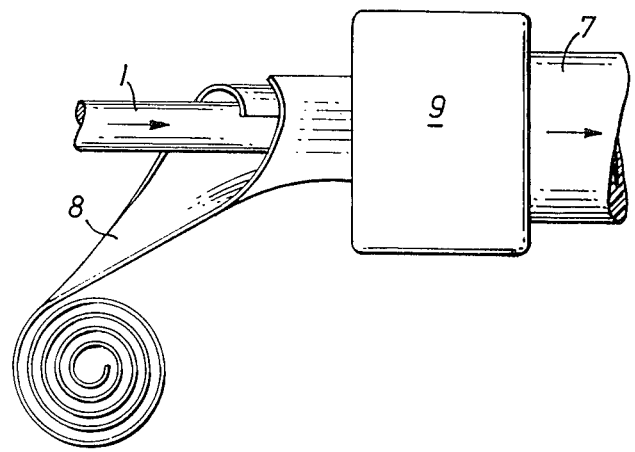
FIG. 2 is a schematic view of an arrangement for fabricating a cable according to the invention.

FIG. 2 shows schematically a procedure for producing a cable according to the present invention. The cable core 1 is enclosed by a prefabricated combined foil 8 composed of a glass fiber band and a metal foil and then passes through a plastic extruder head 9. The prefabricated foil has previously been provided with an adhesive layer 6, as described above, which in the extruder head bonds the plastic sheath 7 to the foil.

It is of course also possible to apply the glass fiber band, the metal foil and the plastic sheath in succession in any desired sequence and to bond them together in the extruder head.

Figure 3:
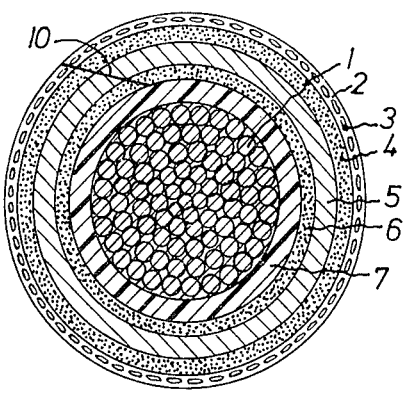
FIG. 3 is another cross-sectional view of a cable constructed according to the present invention at which the assembly of the metal foil and the band of glass fibers encloses the plastic sheath of the cable.

Thus, FIG. 3 shows another embodiment of the invention. A core 1 is enclosed by a core sheath 7 of a plastic material. Said sheath 7 is connected via adhesive layer 6 with a metal foil 5. A band 2 is attached to the metal foil via adhesive layer 4, the band 2 consisting of parallel, longitudinally extending glass fibers 3.

Figure 4:
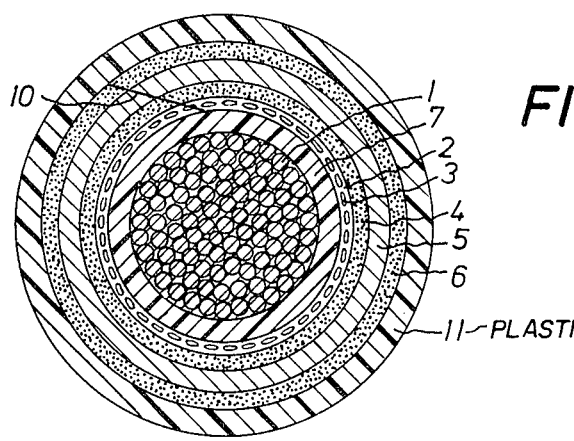
FIG. 4 is still another cross-sectional view of a cable constructed according to the present invention comprising an additional plastic sheath enclosing the assembly of the metal foil and the band of glass fibers.

FIG. 4 shows a cross-sectional view of still another cable constructed according to the invention at which a core 1 is enclosed by a core sheath 7 of plastic material. Said sheath 7 is enclosed by a band 2 consisting of glass fibers 3, which are connected via adhesive layer 4 with a surrounding metal foil 5. A further adhesive layer 6 is applied to the metal foil 5 and layer 6 is bonded to an additional enclosing core sheath 11.

Figure 5:
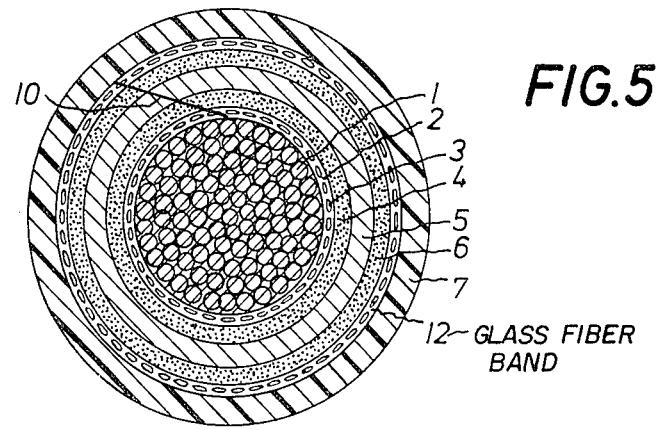
FIG. 5 is still another cross-sectional view of a cable constructed according to the present invention at which the band of glass fibers is constituted by two partial bands each attached to a respective side of the metal foil.

FIG. 5 shows another embodiment of the invention. Around a cable core 1 is applied a band 2, said band 2 consisting of parallel, longitudinally extending glass fibers 3 attached to a metal foil 5 by an adhesive layer 4. Another (partial) band 12 of glass fibers is attached to the outer side of said metal foil 5. Band 12 is enclosed by a core sheath 7 of plastic material.

In a preferred embodiment of the invention the thickness of the band 2 is between 0.5 and 1 mm, the adhesive layers 4 and 6 of a copolymer of ethylene have a thickness of 5/100 mm, the metal foil 5, which consists of copper or aluminum, has a thickness of 0.2 mm, and the sheath 7 which is of polyethylene or polyvinylchloride has a thickness of 2 to 3 mm. The diameters of the strands of glass fibers 3 in band 2 are between 0.1 and to 0.2 mm.

Specific copolymers of polyethylene which can be employed for the adhesive layers are ethylene-vinylacetate, ethylene acrylate-copolymer or ethylene-propylene-(ter)-polymer.

The extrusion head is well known in the art, the one used is manufactured and commercially available by Maillefer. The polyethylene-sheath is extruded around the assembly of the metal foil and the glass fiber band by the extrusion head at temperatures of 180° to 220°C.

The band of glass fibers may be presaturated before being used with a contact-enhancing liquid. This preliminary step is well known in the art as "silanising."

The provision of a band of glass-fibers may be preceded by subjecting a sheet of parallel glass fibers to a pressure rolling process with a specific surface pressure of 4 kiloponds/cm² by which the layer is thinned to a thickness of 20 % of the thickness of the layer prior to such application of pressure.

It will be understood that the above description of the present invention is susceptible to various modifications, changes and adaptations, and the same are intended to be comprehended within the meaning and range of equivalents of the appended claims.

I claim:

1. A cable having a core enclosed by a high tensile strength sheathing, and sheathing comprising: a band of parallel longitudinally extending glass fibers and a metal foil, said band and said foil each having opposed longitudinal edges and being wrapped around said core so that their edges overlap to form a seam; a first layer of adhesive interposed between, and attaching together, said band and said foil; and a plastic sheath enclosing said core and bonded to the assembly of said band and said foil for holding said edges together.

2. Cable as defined in claim 1 wherein said plastic sheath encloses the assembly of said metal foil and said band of glass fibers.

3. Cable as defined in claim 1 wherein said plastic sheath is disposed between said core and said assembly of said metal foil and said band of glass fibers.

4. Cable as defined in claim 3 further comprising an additional plastic sheath enclosing the assembly of said metal foil and said band of glass fibers.

5. Cable as defined in claim 1 wherein said band is composed of individual parallel extending glass fiber strands and each strand is individually connected with said metal foil by said first adhesive layer.

6. Cable as defined in claim 1 wherein said band comprises a plurality of superimposed glass fiber layers.

7. Cable as defined in claim 1 wherein said band is constituted by two partial bands each attached to a respective side of said metal foil.

8. Cable as defined in claim 1 wherein said band further comprises transversely extending glass fibers interwoven with said longitudinally extending fibers.

9. Cable as defined in claim 1 wherein said band is initially provided as a layer which is compressed so that when said band is wrapped around said core the layer of glass fibers at the seam is as thin as possible.

10. Cable as defined in claim 1 wherein only a thin layer of said glass fibers is present along the overlap seam.

* * * * *